July 20, 1965 E. F. KLEINSCHMIDT ET AL 3,196,209

KEYBOARD COMMUNICATIONS EQUIPMENT

Original Filed Nov. 16, 1955 3 Sheets-Sheet 1

INVENTORS
Edward F. Kleinschmidt
John W. Ehrlich
Edward E. Podwojski

BY Strauch, Nolan & Neale
Attorneys

KEYBOARD COMMUNICATIONS EQUIPMENT

Original Filed Nov. 16, 1955

3 Sheets-Sheet 2

INVENTORS
Edward F. Kleinschmidt
John W. Ehrlich
Edward E. Podwojski
BY
Strauch, Nolan + Neale
Attorneys INVENTORS
Edward F. Kleinschmidt
John W. Ehrlich
Edward E. Podwojski
BY
Strauch, Nolan + Neale
Attorneys United States Patent Office 3,196,209
Patented July 20, 1965

3,196,209
KEYBOARD COMMUNICATIONS EQUIPMENT

Edward F. Kleinschmidt, Wilmette, and John W. Ehrlich, Glenview, Ill., and Edward E. Podwojski, Santa Barbara, Calif., assignors to SCM Corporation, a corporation of New York Original application Nov. 16, 1955, Ser. No. 547,265, now Patent No. 3,009,988. Divided and this application July 26, 1961, Ser. No. 127,036
16 Claims. (Cl. 178—17)

The present invention relates to improvements in the keyboard of message communication equipment of the type that is operative to produce a legible record of messages transmitted and recorded and to improvements rendering it lighter in weight, more compact in construction, and otherwise adapted for use in aircraft. This application is a division of application Serial No. 547,265, filed November 16, 1955, for Communications Equipment, now U.S. Patent No. 3,009,988, to which reference may be had for a more complete understanding of structural and functional cooperation between the keyboard and exemplary related equipment.

The keyboard of this present invention in general form is similar to a standard teletypewriter keyboard. However modifications in several of the mechanisms, constitute specific aspects of this invention. Used in conjunction with the communication set of Patent No. 3,009,988, the keyboard may be used selectively to control the transmission of messages or to control the storage of message signals for future transmission, a printed record being made of the message in either event. Although, if necessary, the keyboard can be arranged to accommodate a larger number of character representations, the preferred and disclosed embodiment is arranged for transmission of signals indicative of the twenty-six characters of the alphabet, plus line return, line feed, letters and space.

Signal devices are included as components of the keyboard unit to enable the operator to visually determine several limit conditions of the complete set, i.e., the approach of the end condition of the magnetic tape in tape recorder and the approach of the end of line position on page printer. These signal devices are lamps which when illuminated indicate the above two conditions. Although the page printer of the complete set will automatically initiate line return and line feed, the keyboard operator, using proper sending technique, should send a line return and line feed signal at the end of each line, hence the need for an indicator to inform the keyboard operator when such position is being approached. In a conventional manner this transmitter utilizes five notched code bars actuated by the transmitter keys. Depending on the character key depressed, the five code bars are moved into a predetermined permutation, each bar moving either to the right or left side. Each code bar is associated with a pair of contacts and, when moved to the right, the bar will cause its set of contacts to close, conversely when moving to the left the bar will cause the contacts to be opened. Closed contacts represent mark impulses and open contacts represent space impulses. Thus each key will operate the code bars to provide a particular combination of five signals represented by the condition of the five code bar switches. The keyboard prepares the contacts for a simultaneous five unit signal combination that is fed through five separate line circuits to the main control unit circuit.

Immediately behind or parallel with the five code bars in a universal bar that always shifts in one direction whenever a key or the space bar is depressed and enables a code bar locking wedge to be biased into locking cooperation with the five code bars and the universal bar. Movement of the locking wedge into locking position prevents a resetting of the code bars and closes a sixth set of contacts. This action occurs each time a key is depressed, except as hereinafter described for repeat blocking. Due to a built-in mechanical time delay, the code bar contacts are completely set before the universal bar contact circuit is energized through actuation of the sixth set of contacts by the locking wedge. This enables the five unit code combination to be completely integrated into the control circuit before the control circuit electronic matrix is operated to transmit the code signal. The universal bar wedge actuated contacts initiate control circuit operation to transmit the code signal in the manner desired and determined by the operator. Such control circuit operation, subsequent to code transmission, actuates a code bar locking wedge solenoid to release the locking wedge and enable the next key to be depressed which re-shifts the code bars and universal bar to repeat the transmitting operation.

Incorporated on the universal bar is a novel repeat blocking device that cooperates with the locking wedge to prevent the wedge from relocking if any key is held in a depressed position which positively retains the universal bar in its shifted position. If the locking wedge cannot move to locking position its contacts cannot be closed and the control circuit will be inoperative for the combination of signal impulses represented by the code bar contacts. Release of the depressed key will permit the universal bar to shift back to its normal position and the repeat blocking device becomes inoperative.

Repeat blocking is inoperative upon space bar operation because the space bar has its own transmitter operating contacts in a circuit parallel to those of the wedge actuated contacts. If the space bar is depressed and held down the transmitter will repeat the combination of signals representing a space until the space bar is released.

Accordingly, a primary object of this invention resides in the provision of a novel keyboard transmitter unit which is small, compact, lightweight and dependable, being peculiarly adapted for use in aircraft and similar relatively small vehicle installations in conjunction with other telecommunication and radio communication equipment.

Another object of this invention is to provide a novel keyboard transmitter having permutatively arrangeable code bars and a universal bar, arranged by depression of keys, with individual sets of contacts actuated by the code bars and movement of the universal bar with a predetermined time delay between code bar contact actuation and universal bar contact operation.

A still further object of this invention resides in the provision in a keyboard code bar transmitter of a novel locking wedge operated into locking cooperation with all code bars upon final shift of the universal bar and the locking wedge actuation controls a set of contacts to start transmitting operation.

Still another object of this invention resides in the provision in a keyboard code bar transmitter having a code bar locking wedge that controls the start of transmission and can move into locking position only when the transmitter universal bar is in its shifted position, of a novel repeat blocking device cooperating between the locking wedge and universal bar to prevent repeat transmissions if the universal bar is not permitted to shift back to its start position.

These and other objects of the present invention will become more fully apparent by reference to the appended claims and as the following detailed disclosure proceeds with reference to the accompanying drawings wherein:

FIGURE 7 is a schematic wiring diagram of the keyboard unit.

*General*

The keyboard of the present invention is designed primarily for use with communication equipment in an airborne installation in cooperation with a radio transmitter and a radio receiver. The equipment may be operated to control the radio transmitter to transmit a time sequential message signal coded in the well known Baudot code directly under control of the keyboard.

*Keyboard circuitry*

While the detailed structure of the keyboard will be given hereinafter, a general description at this point will be helpful in understanding the circuitry involved. The keyboard 52 consists of 29 keys, a space bar, two red lamps I–802 and I–803 and associated equipment.

Five code bars, used to set up the mechanical form of the code signal, are located under the key levers and run the width of the keyboard so that they can be engaged by depressing any key lever. Each code bar is notched in one of two ways at the points where it is engaged by each lever. The sides of these notches are slanted to the right or left so that a downward movement of a keylever pushes the code bars either to the right or left. The notches are cut so that the first code bar will move to the right if the first unit of the code for the key depressed is a marking impulse. Whereas, if the second unit of the code is a spacing impulse, the movement of the code bar will be to the left. Thus, depression of the Y key sets up the five-unit code for that letter in the code bars by moving the first, third, and fifth code bars to the right and the second and fourth code bars to the left.

Figure 3:
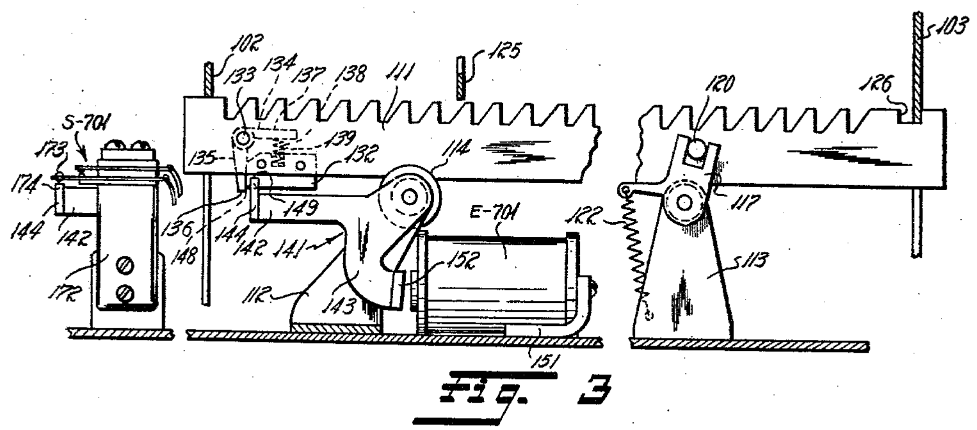
FIGURES 3, 4 and 5 are detail views from the rear of the keyboard unit showing the relationship between the universal bar and locking wedge in the respective inoperative position, the initial shifted position and the repeat blocking position.

During keyboard operations, the movement of the code bar to the right or left rocks a bell crank which is pivoted on the bar. The positions of the bell crank for each bar at the right end of the keyboard controls the engagement of a pair of contacts. When the code bar moves to the right, the associated contacts are closed; when it is moved to the left, the contacts are opened. Code bars numbered 1 to 5 are associated respectively with contacts S–706, S–705, S–704, S–703 and S–702 (FIGURE 3). The code bars 1 to 5 correspond respectively to the five intelligence unit signals of the five unit Baudot code which, with the start and stop signals, make up the conventional Baudot code signal group. The contacts when closed represent a mark signal in the code group and, when open, represent a space signal.

The movable arms of the contacts S–702, S–703, S–704, S–705 and S–706 are connected in common through pin K of J–701 and through related transmitting equipment to ground, when a control circuit (not shown) is set to a position in which the keyboard is manipulated. The fixed contacts of the code bar actuated switches S–706, S–705, S–704, S–703 and S–702 are respectively connected through contacts A, B, C, D and E of J–701 through related equipment circuits to storage relays (not shown) in the related transmitter equipment. The opposite terminals of these relays are connected in common to a 26.5 volt direct current power line. Through these circuits, the closing of any one of the contacts S–706, S–705, S–704, S–703 or S–702 will energize the corresponding of the storage relays (not shown) of related transmitting equipment relays. Thus, upon depression of a key on the keyboard, the relays corresponding the mark signals in the code group indicative of the significance of the key depressed are energized and those corresponding to space signals remain deenergized.

A universal bar which is located in back of the five code bars is moved to close contacts S–701 (FIGURE 3) each time a key is depressed. The keyboard mechanism is such that S–701 will close subsequent to a slight delay after the actuation of the five code bar controlled contacts S–702 to S–706. The movable contact of universal bar contact S–701 is connected through a normally closed contact of the space bar actuated repeat contact group S–707 to pin K of J–701 which, as has been previously explained, is grounded so long as a control circuit is set to keyboard operation. The fixed contact of S–701 is connected through contact F of J–701 to a control relay (not shown) in the related equipment for starting the transmission initiating equipment which provides the eight basic timed signals for controlling the operation of the equipment for the period of one code group.

Upon depression of a key on the keyboard, a mechanically actuated locking wedge engages the left hand bell cranks of the code bars in the keyboard 50 to hold the code bars in position after a key has been depressed until this locking wedge is released by energization of the keyboard unlock coil E–701 (FIGURE 3). The locking wedge prevents the operator from exceeding the typing rate acceptable by the other units. One side of the keyboard unlock coil E–701 is connected through pin N of J–701 to the terminal of a power supply (not shown). The other side of keyboard unlock coil is connected through pin L of J–701 to a circuit (not shown) controlled by the completion of generation of the five coded units in the eight basic timed signals in the related equipment.

*Keyboard construction*

The keyboard is basically a standard form of teletypewriter keyboard but incorporates some special mechanisms as will be illustrated and described with reference to FIGURES 1 through 6. With respect to FIGURES 1 and 2, the keyboard 50 has a base plate 101 with two side plates 102 and 103 secured to the base plate adjacent each end. Each side plate 102 and 103 has six parallel slots 104 that provide guideways for five notched code bars 106, 107, 108, 109 and 110 and one universal code bar 111 disposed for sliding movement to right and left. Left and right code bar support brackets 112 and 113 respectively, are secured to base plate 101 below code bars 106 through 111. The left hand support bracket 112 carries a shaft with spacers 114 and rollers, not shown, which coact with the lower edge of each code bar and provide a roller track for longitudinal shifting. The right hand support bracket 113 carries a pivot shaft 115 which journals five code bar contact bell cranks 116, and one code bar spring lever 117 which are maintained in spaced relation by rollers 118 which support the right end of the code bars. Bell cranks 116 and 117 have an upwardly directed forked portion disposed along the side of a respective code bar which fits around a code bar pivot post 120 secured in the side of each code bar.

Each of the five contact bell cranks 116 includes a horizontal arm having its end 121 formed as a contact actuator. The spring bell crank 117 is disposed adjacent the universal bar 111 and pivotally engages its pivot post 120 in a manner similar to that described for the contact bell crank 116. However, the spring lever horizontal arm extends toward the left hand side of the printer and cooperates with a spring 122 connected to an anchor fixed to the base plate 101, thereby biasing the universal bar 111 to its left hand position.

In a conventional manner the upper edge of each code bar is serrated with a plurality of inclined notches arranged with a right or left incline whereby depression of a key 124 and its associated key bar 125 into engagement with an inclined edge of a notch will shift a code bar in a predetermined manner to the right or left. Through cooperation of the five code bars 106–110 with contact levers 116, any code bar moving to the right will pivot its contact lever 116 clockwise (FIGURE 1) to close individual sets of contacts associated with each contact lever in a manner to be described. Movement of any of the code bars 106–110 to the left will pivot the respective contact levers 116 counterclockwise, which movement positively assures that the associated individual sets of contacts are open. Closed contacts indicate a "mark" condition while open contacts indicate a "space" condition. Thus in accordance with a right or left-hand shift of the five individual code bars 106–110, a representation of a five unit combination Baudot or similar code signals will be set up in the sets of contacts. The sixth code bar 111, a universal bar, has all of the notches in its upper surface inclined in a direction to shift the universal bar toward the right every time any key 124 is depressed, against the bias of spring 122. The universal bar is the only one of the code bars that is positively spring loaded to an unoperated position. The right hand end of every code bar has a square notch 126 provided in its upper edge for cooperation with the upper edge of the vertical slots in the right hand side plate thereby providing a limit stop for longitudinal shift of all code bars.

On the lower edge of code bars 106–111, a single centrally located inclined notch 127 is present. These notches 127 are used in conjunction with the spacing mechanism (later described) and their inclinations are so arranged to determine "spacing" position of the code bars 106–110 and to shift the universal bar 111 to the right. The left hand lower edge of code bars 106–110 includes two notches 128 and 129 which furnish a means for locking the bars during transmission of a signal. As is conventional in this form of code bar keyboard, when the five code bars are shifted by depression of one key no other key can be depressed. Therefore if the code bars are locked after a key is depressed no other key can be depressed until the code bars are unlocked. This will be discussed further hereinafter with relation to the locking wedge assembly. Each key lever is associated with a key lever return spring 130 which returns the key levers to their initial position out of contact with the code bars when the operator releases the key.

Figure 4:
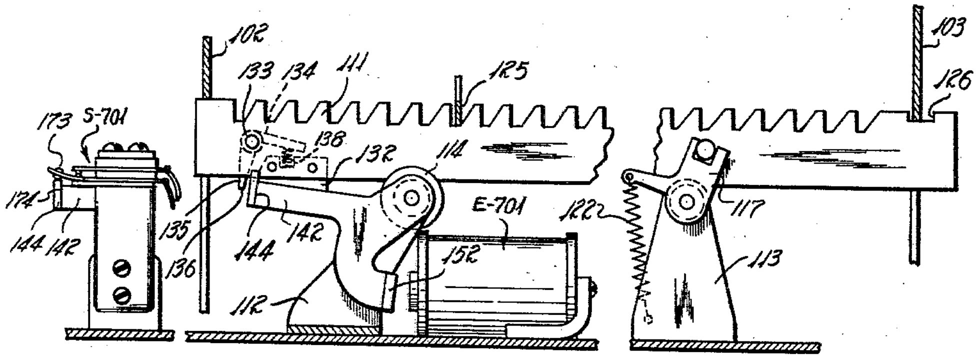
Figure 5:
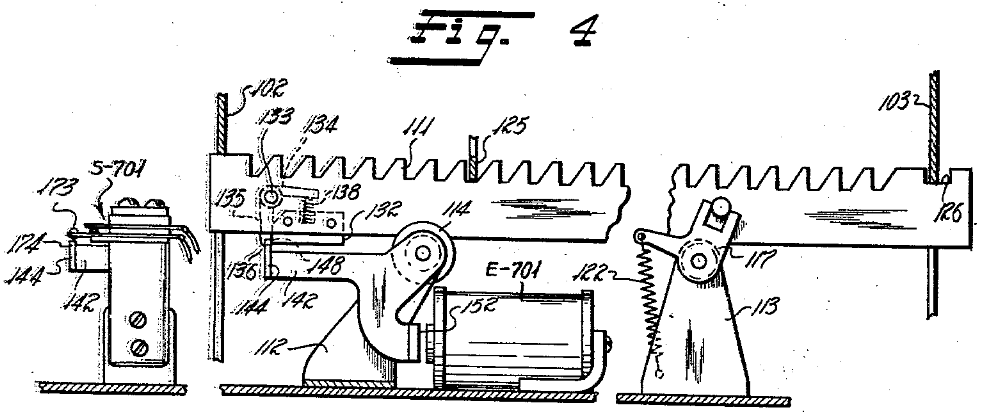
Figure 2:
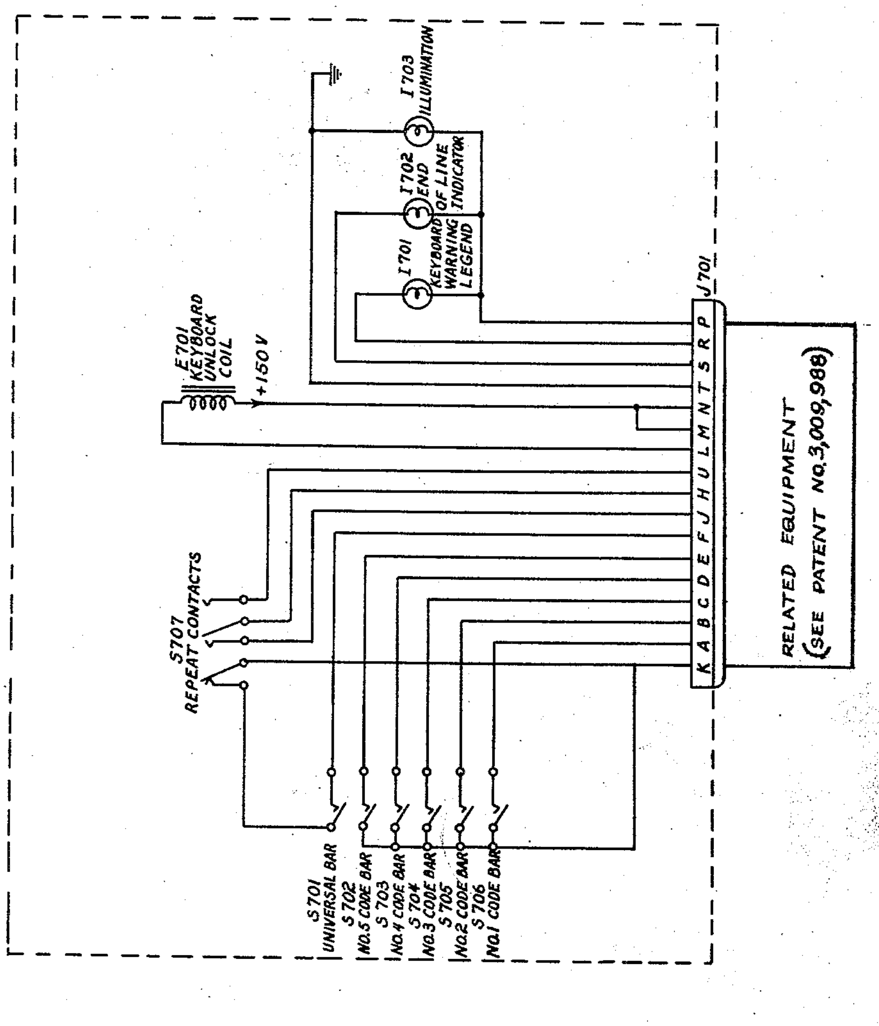

The universal bar 111 has no notches, such as the locking notches 128 and 129 in the code bars. However, adjacent the left hand end of the rear side of universal bar 111 a relatively heavy latch block 132 (FIGURE 3) is riveted and is positioned with its lower surface parallel with and lower than the lower edge of the universal bar. Immediately to the left of latch block 132 a stud 133 is fixed through the universal bar and pivotally carries a repeat blocking latch lever 134. Latch lever 134 is an L-shaped lever having a depending arm 135 disposed adjacent the left edge of latch block 132. When assembled the tip 136 of depending arm 135 extends a short distance below the lower edge of latch block 132 as is illustrated in FIGURES 3, 4 and 5. The upper arm 137 of the latch lever 134 extends horizontally over the upper surface of latch block 132 and is biased counterclockwise (FIGURES 3, 4 and 5), so its depending arm abuts the left edge of latch block 132, by a spring 138 disposed in a socket 139 formed in the upper edge of latch block 132.

Figures 1, 2, 6:
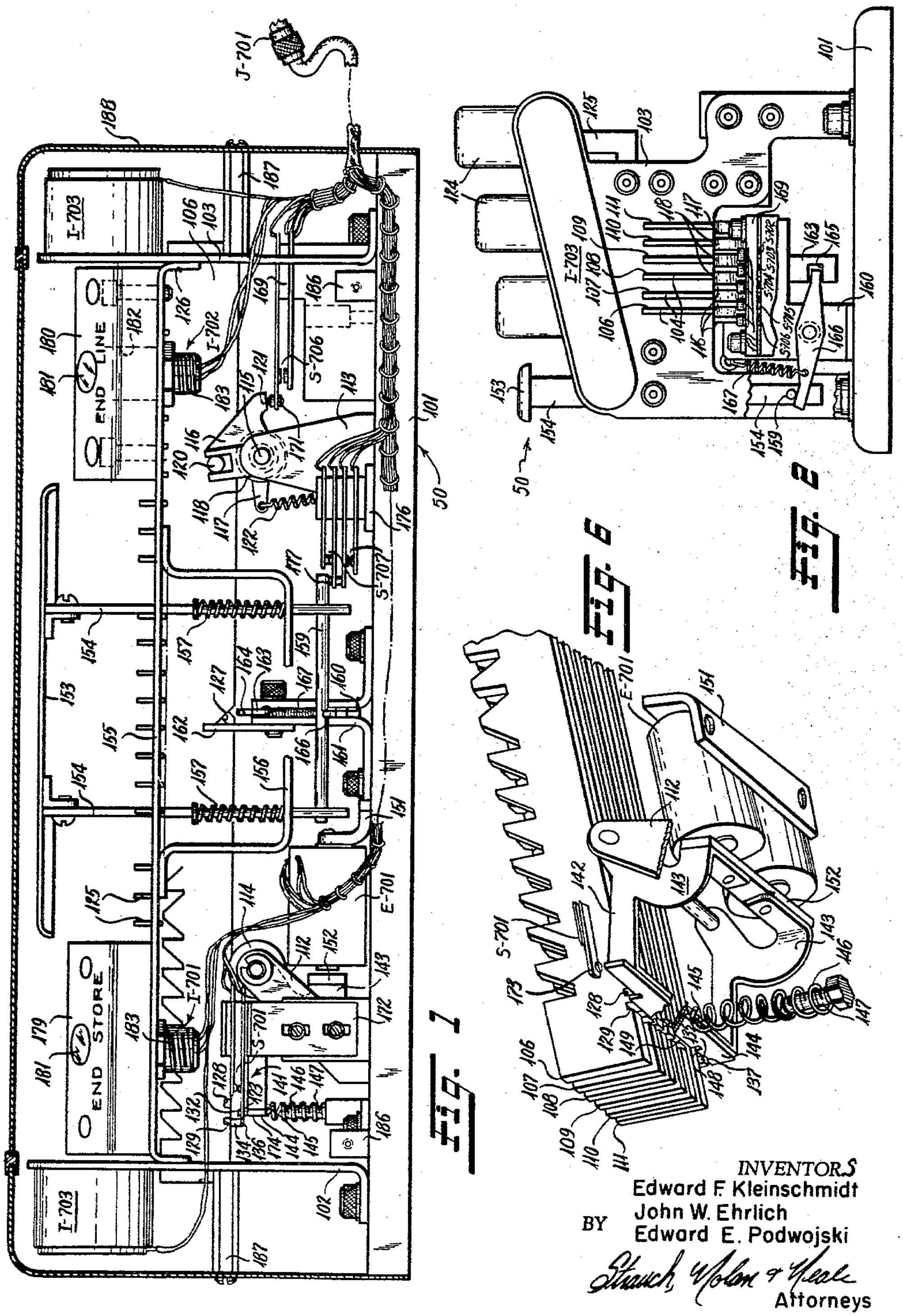
FIGURE 1 is a front elevation view of the keyboard unit, partially broken, illustrating the arrangement of the keys, code bars, locking wedge and associated sets of contacts.
FIGURE 2 is a right hand side view of the keyboard illustrating the code bar contact block and the spacing linkage.
FIGURE 6 is a detail perspective view from below illustrating the cooperation between the locking wedge and the code bars.

Pivotally mounted on the left hand support bracket 112, is a code bar locking wedge assembly 141 including a laterally disposed U-shaped arm 142 and a depending set of arms 143 (FIGURE 6). Secured by rivets on the bight of the U-shaped arm 142 is a substantially vertically disposed locking wedge blade 144. The lower edge of wedge blade 144 includes a depending lug 145 that serves as a retainer for a locking wedge spring 146 whose other end is disposed on a spring post 147 secured to base plate 101. Spring 146 biases the locking wedge assembly clockwise, as viewed in FIGURE 6, so that the wedge blade 144 is biased toward the surfaces of the code bars 106–111. As shown in FIGURE 6, the left top edge 148 of the wedge blade 144 is recessed a slight amount from the top central edge 149 of the blade. The recessed edge 148 abuts the lower edge of latching block 132 while the central wedge blade edge 149 is disposed closely adjacent the lower edges of code bars 106–110. When a key 124 is depressed and the code bars are shifted to left or right in a predetermined combination one of the notches 128 or 129 in code bars 106–110 will be disposed immediately above the central portion 149 of the wedge blade 144. However the locking wedge assembly 141 will not shift into locking position under bias of spring 146 until the universal bar is completely shifted to the right (FIGURE 4) removing the latch block 132 from above the recessed edge 148 of the wedge blade 144. This mechanical relationship between the movement of the code bars 106–110 and the movement of the universal bar 111 a sufficient amount to permit locking wedge assembly actuation is predetermined to permit the code bars 106–110 to be fully positioned just prior to the final movement of the universal bar which then permits the locking wedge to pivot under bias of spring 146 and place the central edge 149 of the wedge blade 144 into the appropriate aligned locking notches 128 or 129 of the five code bars 106–110. This movement of the locking wedge assembly will lock and prevent any further shift of all six code bars 106–111.

Shown in FIGURE 1, a mounting bracket 151, secured to the base plate 101, carries a double solenoid unit E–701. The depending arms 143 of locking wedge assembly 141 have secured thereto a magnet armature 152 which is disposed immediately in front of the pole faces of solenoid unit E–701, a proper flux gap being maintained between armature 102 and the solenoid pole faces. As will be apparent, energization of the solenoid unit E–701 will move the locking wedge assembly 141 against the bias of spring 146, removing the wedge blade 144 from the code bar notches 128 and 129 and from behind the latch block 132 on universal bar 111 permitting the universal bar to be biased by spring 122 to its left hand position. The code bars 106–110 will shift slightly, if they had been key shifted to the right, as a result of the inherent resilience of the contacts, to be described.

When the code bars are initially shifted by depression of a key 124, the universal bar 111, in moving to its right hand position, will cause the side edge of depending arm 135 of the repeat blocking latch lever 134 to engage the side of the wedge blade 144. As illustrated in FIGURE 4, full shifting movement of universal bar 111 by depression of a key 124, will pivot the latch lever 134 against the bias of spring 138. If the key 124 is held in depressed position, the universal bar cannot return to its left hand position when energization of the solenoid E–701 causes a releasing actuation of the locking wedge assembly 141. However the solenoid actuation will remove wedge blade 144 from its latching position in the code bar notches 128 and 129. This simultaneously removes the recessed edge 148 from behind latch block 132 to a position below the tip end 136 of the blocking latch lever's depending arm 135 permitting the latch lever 134 to return its depending arm 135 against the edge of latch block 132 under bias of spring 138 (FIGURE 5). Such action will place the tip end 136 of the latch lever depending arm 135 immediately above the recessed wedge blade edge 148. Therefore, when the solenoid unit E–701 is de-energized to permit the locking wedge assembly to be pivoted under bias of spring 146, the locking wedge assembly is prevented from moving back into a code bar locking position by engagement of the recessed wedge blade edge 148 with the tip end 136 of the depending blocking latch lever arm 135. As the upward movement of wedge blade 144 is utilized, in a manner to be described, to close a set of switch contacts which, through the communication control circuit previously described, starts transmission of the signal combination set up by the code bars 106 through 110, it will be seen that the repeat blocking structure thus described can prevent repeat transmission of a character whose key is held depressed, because the locking wedge assembly is prevented from moving up to close the start operation contacts to initiate the transmitting operation.

A space bar 153, FIGURES 1 and 2, is secured to two vertical guides 154 disposed in holes formed in the forward edge of the front keyboard guide strip 155 and also passing through holes provided in a support bracket 156. Springs 157 disposed between the support bracket 156 and washers clipped to guides 154 bias the space bar 153 to its upward inoperative position. The lower end of guides 154 carry a transverse rod 159 having its right hand end extended to provide a contact actuator, as will be described. Behind the space bar assembly and secured to base plate 101 are two angle brackets 160 and 161 providing a support for a vertically arranged code bar guide comb 162 and vertically guiding a space key bar 163. Space key bar 163 has a lateral top portion 164 disposed beneath all six code bars 106–111 for cooperation with the aforementioned central lower edge notches 127. Adjacent its lower end, the space key bar 163 is notched at one side to form a recess 165 for receiving one end of a spacing lever 166 that is pivotally mounted between the two angle brackets 160 and 161 with its opposite end disposed under the spacing bar rod 159. A spring 167 is fastened adjacent the forward end of spacing lever 166 and biases the lever 166 into contact with the lower side of the spacing bar rod 159. Depression of space bar 153 will, through the rod 159, cause the spacing lever 166 to pivot against the bias of spring 167 and shift the space key bar 163 upwardly into contact with the inclined sides of the lower code bar notches 127, positioning all code bars in the combination representing a space signal. Release of the space bar permits spring 167 to return the lever 166 to its inoperative position, which lowers the space key bar 163 away from cooperation with the code bar notches 127, permitting the universal bar 111 to return to its left hand position.

Fastened to base plate 101 below the right hand ends of code bars 106–110 is a switch block assembly 169 containing five sets of contact switches normally self biased to the open position. The upper leaves of the contact switches project under associated actuator ends 121 of the code bar contact levers 116 and each upper leaf includes a wear pad 171 which is engaged by the actuator end 121 of the contact levers. Code bar 110 is associated with switch S–702, code bar 109 is associated with switch 7–703, code bar 108 is associated with switch S–704, code bar 107 is associated with switch S–705 and code bar 106 is associated with switch S–706. Movement of any of code bars 106–110 to the right will pivot the associated contact actuating lever 116 clockwise (FIGURE 1), moving its actuator end 121 into engagement with the associated switch leaf wear pad 171 to move the upper switch leaf and its contact into engagement with the lower leaf and its contact thereby closing the associated switch. The inherent resiliency of the upper switch contact leaf is sufficient to open the contact when a depressed key is released and the code bars are unlocked to enable a shifting movement of the code bar to the left. Deliberate shift of a code bar to the left by depression of a key will positively remove the actuator end 121 of the contact actuating lever 116 from its associated contact wear pad 171 to enable the switch to be resiliently opened when such a switch condition is desired by the preset code bar combination. The upper leaves of all switches S–702 through S–706 are connected to a common line while the lower leaves are connected to individual lines leading into a keyboard socket J–701 which is adapted to be connected with the control circuit.

Seen at the left hand side of the keyboard unit 50 (FIGURE 1) is a universal bar switch S–701, mounted on a bracket 172 which is secured to the base plate 101. The universal switch S–701 includes two contacts normally in open condition. One contact includes a wear pad 173 disposed above a lateral extension 174 of the locking wedge blade 144. Whenever the locking wedge assembly moves to a locking position in code bar notches 128 and 129, such upward movement will cause the wedge blade lateral extension 174 to abut the universal switch wear pad 173 and cause the switch contacts to close (FIGURE 4). As previously mentioned the repeat blocking mechanism will prevent upward movement of the locking wedge assembly (FIGURE 5) if a key is held depressed after a signal has been transmitted and the solenoid unit E–701 has been energized and de-energized and the universal contact S–701 is prevented from being moved to a closed position, thereby preventing initiation of a transmitting operation. Lead lines from the two contacts of switch S–701 connect into the socket J–701.

To permit repeated transmission of spacing signals by continued depression of space bar 153 a space bar switch S–707 is mounted on a bracket 176 adjacent the extended end on the space bar rod 159. Switch S–707 has three sets of contacts one of which sets is normally closed and the other two are open. These sets of switches and their function in the overall circuit are described in the control section of the specification with reference to FIGURE 7. The switch S–707 has an operating arm wear pad 177 disposed immediately below the actuator end of rod 159 and when the space bar is depressed the actuator end of rod 159 contacts wear pad 177 and opens the normally closed contacts and closes the normally open contacts of switch S–707. Switch S–707 is wired in the control circuit to initiate the transmitting mechanism and will repeatedly send spacing signals, as set up by the code bar switches S–702 through S–706, until the space bar 153 is released to enable the sets of contacts of switch S–707 to return to their normal positions. The leads from the various contacts of switch S–707 are also connected into the socket J–701.

Mounted at each end of the front keyboard guide strip 155 are two blocks 179 and 180 of Lucite or similar material, which have a blind hole 182 drilled in their lower surface. Both of the Lucite blocks 179 and 180 are covered with an opaque surface material excepting for a small circular portion 181 aligned over the blind bore 182. Lamp sockets 183 are fastened to the keyboard guide strip immediately below the blind bore in blocks 179 and 180. The left hand block 179 surrounds a lamp I–701 which is disposed in its respective socket 183 while a similar lamp I–702 is enclosed in the right hand block 180 and disposed in its respective socket 183. The lamp I–701 in the left hand socket is used to visually signal the keyboard operator that the end position of the magnetic tape storage unit is approaching, a suitable legend being lettered on the opaque surface of the Lucite block 179. In a similar manner the lamp I–702 signals the keyboard operator that he is approaching the end of a line on the page printer and a suitable legend is so inscribed on the opaque surface of the Lucite block 180. By using the Lucite blocks with the blind bore 182, a diffused light is seen through the open circles 181 on the upper surface of the blocks. This is a desired form of lighting in aircraft where direct light rays are undesirable.

The circuit lines for lamps I–701 and I–702 are connected to the socket J–701 for connection into the control circuit. On either end of the keyboard unit mounted on the left and right side plates 102 and 103 are keyboard lighting assemblies I–703, which are connected to a lead connecting to the socket J–701.

Suitable brackets 186 and studs 187 are provided on the keyboard support structure to provide attachment means for an enclosing cover 188.

The keyboard thus described is an integral unitary device having horizontally shiftable code bars each associated with an individual contact switch to preset a simultaneous mark and space signal representative combination according to the Baudot code. The mechanical shifting of code bars 106–111 is accomplished upon depression of any of twenty-six alphabetical character keys, the space bar or a line return, line feed or blank key that can be used for a call signal if desired by adding a special switch (not shown). The simultaneous contact manifestation of the code signal will be set up prior to actuation of a universal bar switch to initiate the start of transmitting operation. This slight delay is built in to afford the control system an opportunity to assimilate the five signals set up by code bars 106–110 before starting a transmitting operation cycle. All code bars are maintained in a locked position according to the depressed key until completion of the transmitting operation at which time a signal is transmitted by the control system to the unlocking solenoid unit E–701 which shifts the locking wedge assembly 141 out of lock position and permits the next key to be depressed to set up a new group of signal manifestations on the code bar contacts. To permit repeat spacing operations, a switch S–707 is provided under the space bar mechanism and is actuated after the code bar contacts have been made thereby enabling the slight required delay for transmitting operation. As switch S–707 controls a circuit in the control system by-passing switch S–701, the repeat blocking control, through the locking wedge assembly 141 and switch S–701, is rendered ineffective and the space signal will be repeated as long as the space bar is depressed. Visual indications are provided for the keyboard operator to determine the amount of storage space left in the magnetic tape recorder and to also signal the approach of the end of a line on the page printer. Normally the end of line light should come on when there is room on the page for about six more characters, i.e., approximately the sixty-sixth character space position on the page.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a keyboard code bar transmitter having two position shiftable code bars and a universal bar: a locking means adapted to be shifted into a direct operative locking engagement with all code bars, means responsive to the final portion of shifting movement of said universal bar subsequent to a full operative shift of said code bars enabling shifting of said locking means to direct locking engagement with all of said code bars; and means, adapted to be engaged and operated by said locking means upon shifting of said locking means into locking engagement, to initiate transmission of a code signal combination as represented by said code bars.

2. In combination with a keyboard code bar transmitter having two position shiftable code bars, a universal bar and a code bar locking wedge which controls the start of transmission; means mounted on and shiftable with said universal bar, operatively associated with said locking wedge to prevent its movement into locking position until said universal bar is shifted to an operative position; and a repeat blocking device cooperating between said locking wedge and said universal bar to prevent a repeat transmission of signals until after said universal bar has been shifted to an inoperative position.

3. In combination with a keyboard code bar transmitter having two position shiftable code bars and universal bar and a code bar locking means which controls the start of transmission; means operatively associated with said locking means to prevent its movement into locking position until said universal bar is shifted to an operative position; a repeat blocking device cooperating between the locking means and universal bar to prevent a repeat transmission of signals until said universal bar has been shifted to an inoperative position; and transmission control means actuated by a spacing operation in the keyboard, for initiating transmission of the spacing signal combination, and including means completely bypassing said repeat blocking device.

4. A keyboard transmitter comprising: keys; permutatively arranged code bars; a universal bar, all bars being set by depression of keys; individual sets of contacts actuated by the code bars and one set of contacts caused to be operated by movement of said universal bar; a plurality of circuits controlled by said contacts; and mechanism operatively inter-relating actuation of all of said contact controlled circuits whereby a predetermined delay permits all individual contact controlled circuits actuated by permutatively shifted code bars to be energized prior to actuation of the circuit controlled by said one set of contacts.

5. In combiation with a keyboard code bar transmitter having a plurality of keys, a universal bar which upon actuation of each key is shifted from a normal position to a working position and means adapted to be operated to initiate transmission of a code combination signal corresponding to a depressed key upon shifting of said universal bar to its working position, a blocking means for preventing repeated transmission of the code combination if a key is maintained depressed comprising: a shiftable member mounted on and carried by said universal bar automatically being shifted relative to said universal bar to engage and block said means to initiate transmission if after completion of the transmission of said key selected code combination signal the universal bar is retained in its working position, said shiftable member automatically unblocking said means to initiate transmission only after the universal bar is returned substantially to its normal position.

6. In a keyboard transmitter, the combination comprising: a plurality of key bars; a plurality of key bar actuated permutation code members individually shiftable to either one of two positions in accordance with actuation of a key bar; individual means cooperating with each code member for transferring coded combination positions of said code members to a transmitting apparatus; a universal member biased to inoperative position and invariably shifted to an operative position upon actuation of any key bar; a first means having a member engaged by and rendered operative by shift of said universal member for initiating transmission of the code combination transferred to said transmitting apparatus; a second means responsive to an external signal, indicative of the end of the transmission of the coded combination, actuable to render said first means inoperative; and blocking means positioned by a shift of said universal member to operative position, rendered operative by retention of a key bar in operative position during actuation of said second means, for preventing said first means from being rendered operative, said blocking means being rendered inoperative by a shift of said universal member back to an inoperative position.

7. In a keyboard transmitter, the combination comprising: a plurality of key bars; a plurality of key bar actuated permutation code members individually shiftable to either one of two positions in accordance with actuation of a key bar; individual switch means cooperating with each code member for transferring coded combination positions of said code members to a plurality of electrical circuits; a universal member invariably shifted to an operative position upon actuation of any key bar; a first means including a switch means and having a member engaged by and rendered operative by a shift of said universal member, subsequent to the code bar positioning, for initiation a signal to control transmission of the code combination in said plurality of electrical circuits; second means responsive to an external signal, indicative of the end of the transmission of the coded combination, actuable to render said first means inoperative; and blocking means positioned by a shift of said universal member to operative position, rendered operative by retention of a key bar in operative position during actuation of said second means, for preventing said first means from being rendered operative, said blocking means being rendered inoperative by a shift of said universal member back to an inoperative position.

8. In a keyboard transmitter the combination comprising: a plurality of key bar actuated permutation code members individually shiftable to either one of two positions in accordance with actuation of a key bar; individual means cooperating with each code member for transferring coded combination positions of said code members to a transmitting apparatus; a universal member biased to inoperative position and invariably shifted to an operative position upon actuation of any key bar; a first means having a device engaged by and rendered operative by a shift of said universal member for initiating transmission of the code combination transferred to said transmitting apparatus; said device including means for engaging and locking said code members in shifted positions; a second means responsve to an external signal, indicative of the end of the transmission of the coded combination, actuable to render said first means inoperative; and blocking means positioned by a shift of said universal member to operative position, render operative by retention of a key bar in operative position during actuation of said second means, for preventing said first means from being rendered operative, said blocking means being rendered inoperative by a shift of said universal member back to an inoperative position.

9. In a keyboard transmitter having a two position shiftable universal bar and means adapted to actuate upon shifting of said universal bar to one position to initiate a start transmission of a code as determined by the keyboard condition; a device on said universal bar rendered operative by retention of said universal bar in said one position after completion of a signal transmission for blocking reactuation of said means until said bar is shifted back to the other position.

10. In a keyboard transmitter having a two position shiftable universal bar and means adapted to actuate upon shifting of said universal bar to one position to lock said universal bar and to initiate a start transmission of a code, set up in the keyboard which is rendered inoperative upon completion of the code transmission; a device on said universal bar rendered operative by retention of said universal bar in said one position after completion of a signal transmission for preventing relocking of said bar and reactuation of said means until said bar is shifted back to the other position.

11. In combination with a keyboard transmitter having keys and a plurality of permutation code members positioned by a key whose operative position is indicative of a coded signal combination: a spring biased universal code member invariably shifted against spring bias upon actuation of any key; a plurality of individual switch means, each positioned in one of two positions by and according to the position of said code members; a single switch means having an actuating member engaging and rendered operable by shifting of said universal bar; means interconnecting each code member with an individual switch means operative to cause coded positioning of all said individual switch means before said single switch means is positioned.

12. In combination with a keyboard transmitter having keys and a plurality of permutation code members, permutatively positioned by a key, having operative positions indicative of a coded signal combination: a spring biased universal code member invariably shifted against spring bias upon actuation of any key; a plurality of individual switch means, each positioned in one of two positions by shifting movement of its associated said code member; a single switch means positioned by shifting of said universal bar; means interconnecting each code member with an individual means operative to cause positioning of said individual means before said single means is positioned.

13. In a keyboard transmitter having a two position shiftable universal bar spring biased to inoperative position and a spring biased shiftable lever means normally blocked by the universal bar against shifting movement and permitted to shift under spring bias a shift of said universal bar to an operative position; means for initiating keyboard transmission, actuated by spring biased shifting of said lever means; means to move said lever means from its spring biased shifted position upon completion of a signal transmission; blocking means on said universal bar, cocked by a shift of said universal bar to the operative position and released from cocked position by the return movement of said lever means, to block spring biased movement of said lever means, if said universal bar remains in an operative position to prevent reactuation of said keyboard transmission initiating means.

14. In a keyboard transmitter having a two position shiftable universal bar spring biased to its inoperative position and a spring biased lever, including an abutment, normally urged by said spring bias against a portion of said universal bar which blocks lever movement under spring bias, said lever being permitted to shift under spring bias upon movement of said universal bar to an operative position to remove said universal bar portion from cooperation with said abutment; switch means actuated by a permitted shift of said lever to initiate keyboard signal transmission; means adapted to return said lever to a spring loaded position upon completion of a signal transmission; a spring biased blocking lever on said universal bar engaged and cocked by said lever during shifting movement of said universal bar relative to said abutment and released, by return of said lever to a spring loaded position, to move to a position adapted to be engaged by said abutment to block lever movement under spring bias.

15. In a keyboard transmitter having a two position shiftable universal bar and a spring biased lever means, including a locking bar normally pressed by the spring biased lever means against an edge of said universal bar blocking movement of said lever means under spring bias, said lever means being permitted to shift under spring bias upon movement of said universal bar to an operative position whereby said edge is removed from cooperation with said locking bar and said locking bar can shift into a new position which locks said universal bar; a first means actuated by a permitted shift of said lever means to initiate keyboard signal transmission; a second means adapted to return said lever means to a spring loaded position to unlock said universal bar and deactuate said first means upon completion of a signal transmission; a spring biased blocking lever on said universal bar engaged and cocked by said lever means during shifting movement of said universal bar relative to said locking bar and released, by return of said lever means to a spring loaded position, to move to a position adapted to block spring biased movement of said lever means.

16. A keyboard transmitter comprising: keys; permutatively shiftable code bars; a universal bar, all bars being shiftable by depression of keys; individual sets of contacts actuated by the code bars and one set of contacts caused to be operated by movement of said universal bar; and means, included in the operative association between said bars and their associated said contacts, constructed with a predetermined delay enabling all individual contacts which are actuated by said permutatively shifted code bars to be actuated prior to actuation of said one set of contacts by said universal bar.

References Cited by the Examiner

UNITED STATES PATENTS

| | | | |
|---|---|---|---|
| 1,924,357 | 8/33 | Griffith | 178—17 |
| 2,754,364 | 7/56 | Kleinschmidt et al. | 178—17 |

FOREIGN PATENTS

| | | |
|---|---|---|
| 642,090 | 8/50 | Great Britain. |
| 854,084 | 11/60 | Great Britain. |

NEIL C. READ, *Primary Examiner.*,

WILLIAM C. COOPER, ROBERT H. ROSE, *Examiners.*